United States Patent
Jusuf et al.

(10) Patent No.: US 6,219,195 B1
(45) Date of Patent: *Apr. 17, 2001

(54) LOW-NOISE MAGNETO-RESISTIVE AMPLIFIER USING CMOS TECHNOLOGY

(75) Inventors: Gani Jusuf, San Carlos; Wen Fang, Fremont, both of CA (US)

(73) Assignee: Marvell Technology Group Ltd. (BM)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,733

(22) Filed: Jan. 29, 1998

(51) Int. Cl.[7] ............... G11B 5/02; G11B 5/09; G11B 15/12
(52) U.S. Cl. .................. 360/67; 360/46; 360/61
(58) Field of Search ............... 360/46, 67, 68, 360/61, 65

(56) References Cited

U.S. PATENT DOCUMENTS

| | | |
|---|---|---|
| 4,786,993 | 11/1988 | Jove et al. . |
| 4,833,559 | 5/1989 | Belk . |
| 4,879,610 | 11/1989 | Jove et al. . |
| 5,327,303 | 7/1994 | Smith . |
| 5,331,478 * | 7/1994 | Aranovsky ............... 360/67 |
| 5,444,579 | 8/1995 | Klein et al. . |
| 5,455,816 * | 10/1995 | Bitting ................... 360/67 |
| 5,548,453 * | 8/1996 | Sasaki et al. ............ 360/67 |
| 5,559,646 * | 9/1996 | Voorman et al. ......... 360/67 |
| 5,625,320 * | 4/1997 | Hagerty .................. 330/2 |
| 5,841,603 * | 11/1998 | Ramalho et al. ......... 360/68 |
| 5,898,532 * | 4/1999 | Du et al. ................. 360/46 |
| 6,038,090 * | 3/2000 | Freitas ................... 360/46 |

* cited by examiner

Primary Examiner—W. Chris Kim
(74) Attorney, Agent, or Firm—Fitzpatrick, Cella, Harper & Scinto

(57) ABSTRACT

Low-noise magneto-resistive (MR) pre-amplifier circuit amplifies signal from MR head. MR head is biased at optimal point by current source to generate signal. Current source is powered by regulator to reduce noise contribution from Vcc due to finite output impedance of current source. Self-biased CMOS low-noise amplifier (LNA) minimizes input-referred noised without using negative power supply. Small MOS transistor with feedback tracking loop replaces self-bias resistor which determines lower corner cutoff frequency. This facilitates use of large-value resistor, thereby enabling on-chip integration of DC blocking input capacitor. Gm—Gm amplifier configuration increases gain bandwidth product and minimizes parasitic effects of MOS transistors.

24 Claims, 3 Drawing Sheets

LOW-NOISE MAGNETO-RESISTIVE AMPLIFIER USING CMOS TECHNOLOGY

FIELD OF THE INVENTION

This invention relates to electronic amplifiers, particularly to low-noise amplifier circuits implemented using complementary metal oxide semiconductor (CMOS) technology for magneto-resistive (MR) applications.

BACKGROUND OF THE INVENTION

In conventional disk drive electronics, magnetic head circuitry is provided for amplifying signals read using magnetic heads, particularly so-called Magneto-Resistive (MR) heads. However, a common problem occurring during MR head operation is voltage discharge to MR heads arising when the head touches disc media.

Hence, due to sensitivity to possible damage from discharge, known designs for MR amplifiers do not operate using conventional five volt power supply. (See U.S. Pat. Nos. 4,786,993 and 5,327,303). In fact, to reduce such damage, conventional MR amplifier designs require either dual power supply voltages with grounded disk assembly or disk assemblies which float at potential equal to that of MR head. (See U.S. Pat. No. 4,879,610 to Jove et al. wherein negative power supply added to amplifier thereby raising total voltage of circuit over five volts, and rotating disk assembly biased from circuit ground to equalize potential of rotating discs with that of MR head. Additionally, U.S. Pat. No. 5,444,579 to Klein et al., discloses MR amplifier design with one end of MR head grounded, but amplifier bias current cannot be optimized for noise performance since MR head and input transistor share current.)

Furthermore, to operate properly, MR heads are typically DC biased. However, unless such DC bias is removed before read signal is received by amplifier, the amplifier may saturate. Commonly coupling capacitors are used to remove DC component from AC signal. However, value of DC blocking coupling capacitor tend to be relatively large and inappropriate for chip integration, particularly when multiple heads require many such capacitors. (See U.S. Pat. No. 4,833,559 to Belk which multiplexes MR elements into external capacitor, and multiplexing transistors are relatively large, thereby introducing substantial amplifier noise.)

There is a need, therefore, for improved, integrated design for low-noise, magneto-resistive pre-amplifier circuits, particularly for implementation in CMOS technology.

SUMMARY OF THE INVENTION

The invention resides in an integrated MOS circuit for amplifying a DC-biased signal received from a magneto-resistive (MR) head, which is grounded at one end. The amplifier circuit includes a blocking capacitor for decoupling current in the MR head from flowing into the amplifier circuit. A low-noise amplifier (LNA) circuit pre-amplifies the received signal, and a programmable high-pass filter (HPF) filters the amplified signal and generates therefrom a differential output signal.

Preferably, the MR head is biased at an optimal point by a current source to generate the received input signal. Such current source is powered by a regulator to reduce noise contribution from Vcc due to finite output impedance of current source. The LNA is a self-biased CMOS circuit which minimizes input-referred noised, without using negative power supply. A relatively small MOS transistor with feedback tracking loop replaces self-bias resistor, which can be chosen selectably as determination factor of lower corner cut-off frequency. This facilitates use of relatively large-value resistor, thereby enabling on-chip integration of the DC blocking input capacitor. As configured, Gm—Gm amplifier circuitry increases gain bandwidth product and minimizes parasitic effects of MOS transistors.

Additionally, the HPF circuit is programmable by adjusting a cut-off frequency, and includes a multiplexer for selecting an amplified signal from various MR heads. The selected signal is coupled to a differential input transistor and resistor-capacitor (RC) network, which is coupled to a differential input transistor. A differential output buffer, coupled to the HPF, generates from the filtered signal differential output signals and functions as a single-ended input to differential output converter. Furthermore, a thermal asperity correction circuit responds to a signal which indicates a thermal asperity event, whereby the correction circuit causes speed-up correction according to programmable HPF settings.

DETAILED DESCRIPTION OF THE PREFERRED EMBODIMENT

Figure 1:
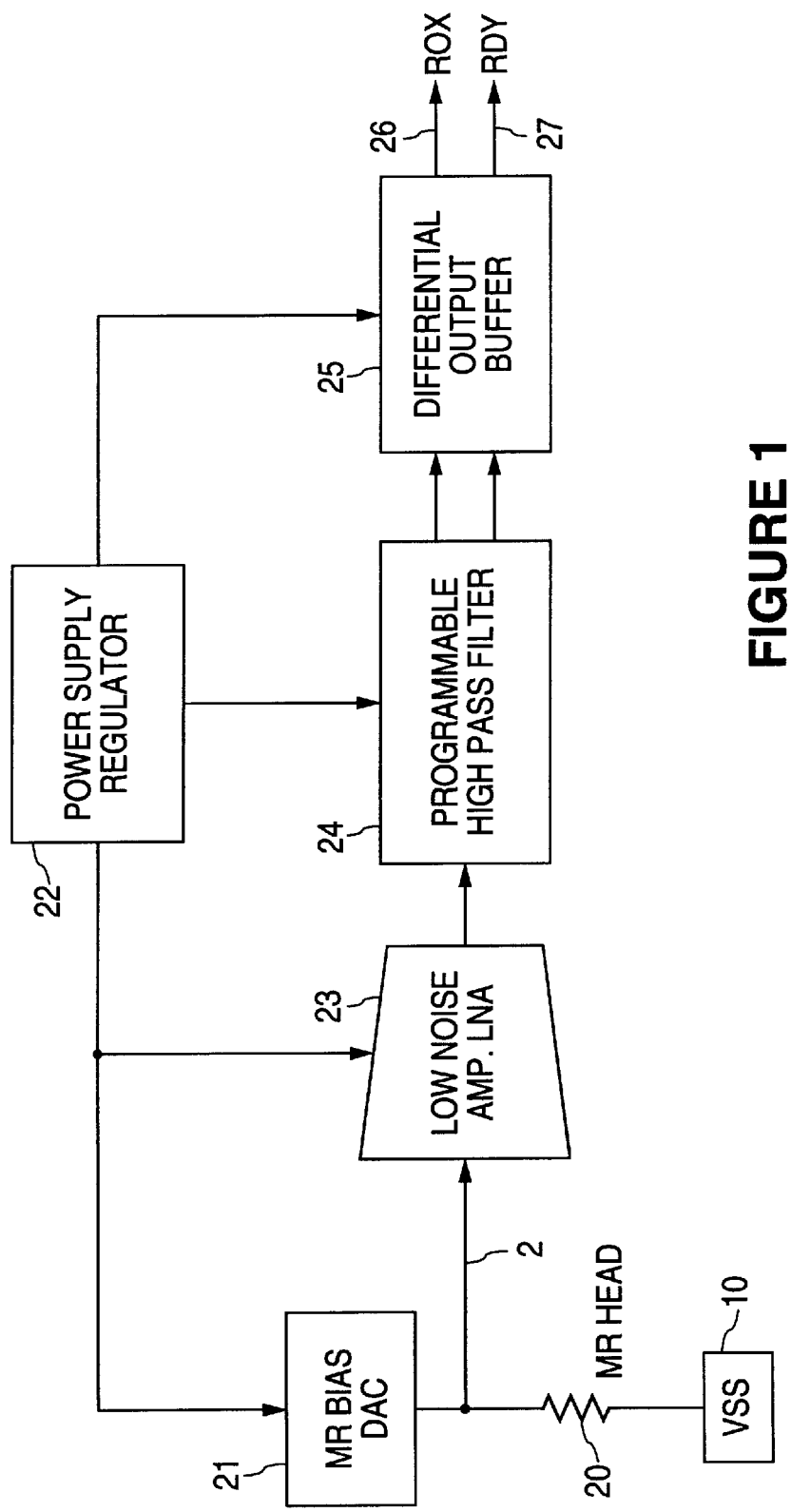
FIG. 1 illustrates a block diagram showing MR head biasing and the circuit architecture of the present invention.

In FIG. 1, a general block diagram includes unipolar magneto-resistive (MR) head 20, low-noise amplifier (LNA) 23, programmable high-pass filter (HPF) 24, differential output buffer 25, and power supply regulator 22. MR preamplifier circuit 23 amplifies signal 2 received from MR head 20. MR head 20 is DC-biased at optimal current by MR bias digital-analog converter (DAC) circuit 21 to generate such signal 2. Since voltage of such signal 2 is relatively small, typically in order of $10^{-4}$ V, compared to head voltage, MR bias DAC 21 which is programmable current source, is powered by regulator 22 to reduce noise contribution from Vcc due to finite output impedance of current source.

Small AC signal 2 from MR head 20 is amplified by LNA 23 and then received by HPF 24, which converts single-ended signal to differential signal. Differential signal is amplified by differential output buffer 25 and provided to output pads RDX 26, RDY 27, which preferably connect to conventional read-channel circuit (not shown) for further processing.

As shown in FIG. 1, one of terminals or ends of MR head 20 is grounded 10, thereby preventing sensitive MR head from damage when head shorts to disk medium occasionally, for example, when both MR head and recording medium have essentially same ground potential. In addition, constant current bias DAC 21 prevents head 20 from damage due to current limiting nature of current source.

Note, as used herein, the term MR pertains not only to conventional magneto-resistive head technology, but also to so-called giant magneto-resistive (GMR) head technology and various other magneto-resistive head technologies.

Figure 2A:
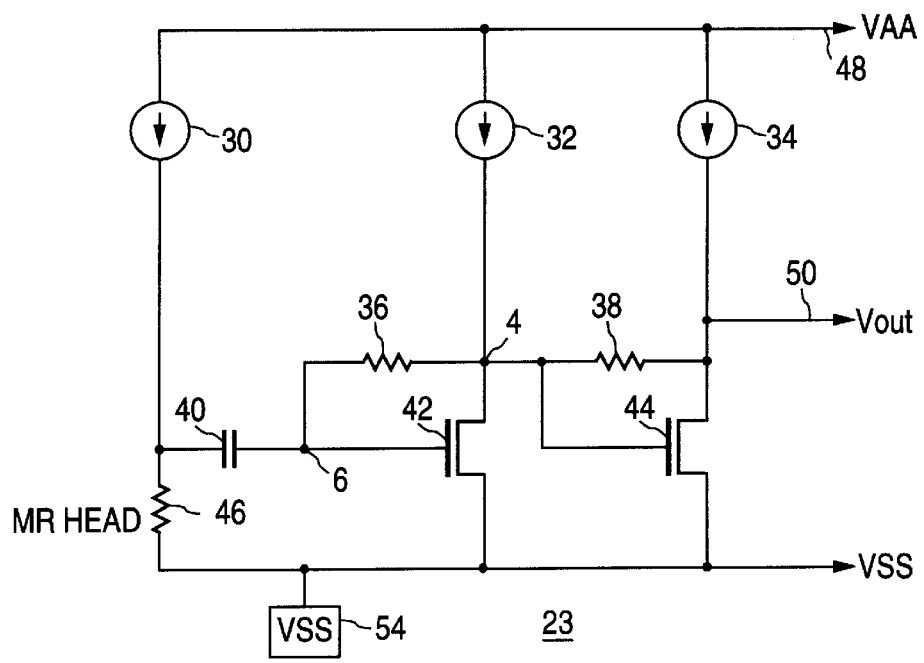
FIG. 2A illustrates a transistor level diagram of the low noise amplifier (LNA) showing the Gm—Gm configuration and the input DC blocking high pass filter.

FIG. 2A is transistor-level diagram of LNA 23, in preferred circuit implementation. LNA 23 includes two MOS transistors 42, 44 (preferably N-channel), with input capacitor 40 serving as DC blocking coupling capacitor for decoupling MR head 46 current from node 6 and rest of amplifier circuitry. LNA 23 provides amplified signal output (Vout) 50, relative to $V_{AA}$ 48 and $V_{SS}$ 54. Resistor 36 functions as self-bias resistor for MOS transistor 42 and high-pass filter together with capacitor 40. Current sources 32, 34 provide bias currents for transistors 42, 44 respectively. Current source or DAC 30 serves as MR bias for MR head 46.

Preferably, passive component values for RC-circuit equivalent 40, 36 are selectably chosen to determine 3 db low cut-off frequency according to applicable design and manufacturing factors such as process, temperature, and power supply parameters. Hence, as contemplated herein, whereas relatively small MOS transistor with feedback tracking loop may replace self-bias resistor, as chosen selectably to be a determination factor of lower corner cut-off frequency, such cut-off frequency can also be determined by high-pass cut-off frequency of single-ended differential converter.

To function effectively as low-noise amplifier for disk drive application, input transistor 42 has relatively large transconductance Gm, and therefore relatively large gate capacitance Cgs. However, such large gate capacitance may cause resonance with head inductance in amplifier passband. In addition, large gate capacitance may require relatively large input coupling capacitor 40, making single-chip integration more difficult.

Using conventional sub-micron CMOS process technology, transconductance values of MOS transistors, as specified herein, are designed and manufactured to be large enough compared to conventional bipolar transistor technology, while input gate capacitance remains relatively small. Small input gate capacitance of transistor 42 increases resonant frequency further away from passband and enabling integration of input coupling capacitor 40. Hence, bipolar transistor is no longer required for implementing low-noise amplifier.

Although gate capacitance of MOS transistor scales down linearly with transistor channel length, output impedance of MOS transistor scales down adversely, thereby rendering difficult implementation of low-noise, high-gain amplifier. Nonetheless, to overcome such difficulty, second MOS transistor 44 is included, as shown. Resistor 38 is used as feedback resistor, of so-called "shunt—shunt" type, which reduces input and output impedances. Low input impedance of transistor 44 reduces voltage swing on node 4 to minimize Miller effect of input transistor 42. Low output impedance may increase bandwidth of amplifier circuit.

Resistor 36 value is expressed as $1/(2*PI*C10*fL)$, where fL is lower cut-off frequency of preamplifier, usually in order of few hundred KHz. Hence, value of resistor 36 is in order of few $10^4$ ohms. Such value of resistor 36 may have relatively large parasitic capacitance to substrate due to conventional fabrication process not having high sheet resistance. Parasitic capacitance couples substrate noise into sensitive input node 6 and adversely affects noise performance of LNA 23.

Figure 2B:
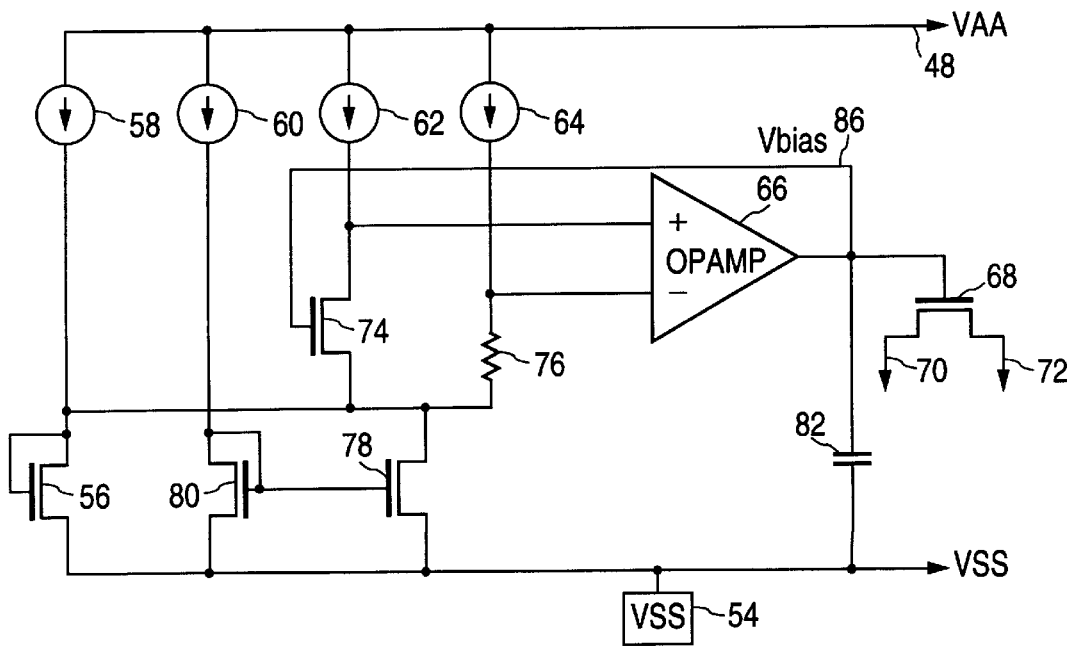
FIG. 2B shows a feedback tracking loop to replace bias resistor 36 in FIG. 2A.

In FIG. 2B, relatively small MOS transistor 68 with feedback tracking loop replaces self-bias resistor 36, thereby determining lower corner cut-off frequency. This MOS circuit implementation facilitates use of relatively large-value resistor, thereby enabling on-chip integration of DC blocking input capacitor 40. Since value of resistor 36 is in order of few $10^4$ ohms, transistor 68 is designed and manufactured relatively small to minimize substrate noise coupling. However, resistance of MOS transistor in linear region varies with temperature and process, thus possibly rendering inaccurate cutoff frequency of input high pass filter.

Feedback loop with operational amplifier (OPAMP) 66 controls equivalent resistance of transistor 68. Hence, alternatively, transistor 68 including feedback loop coupled thereto through OPAMP 66 effectively replaces resistor 36 by coupling transistor nodes 70, 72 instead to resistor 36 nodes 4, 6. When operating, OPAMP 66 compares resistance of transistor 74 with resistor 76 to produce control voltage (Vbias) 86 to gate of transistor 74, thereby making resistance of transistor 74 and resistor 76 substantially same. Resistor 76 may couple through transistor 56 or 78 to $V_{SS}$ 54. Vbias 86 connects OPAMP 66 output signal to capacitor 82, transistor 74 gate and slave transistor 68, thereby effectively replacing resistor 36 of FIG. 2A.

Transistor 56 generates common-mode voltage substantially same as that of node 6 in FIG. 2A. In addition, such common-mode voltage provides suitable drain-to-source voltage for current source transistor 78. Capacitor 82 effectively creates dominant pole to stabilize feedback loop. Further, current sources 64, 62, 60, 58 couple to $V_{AA}$ 48 and respectively to resistor 76, transistor 74, transistor 80, transistor 56, as shown.

Figure 3:
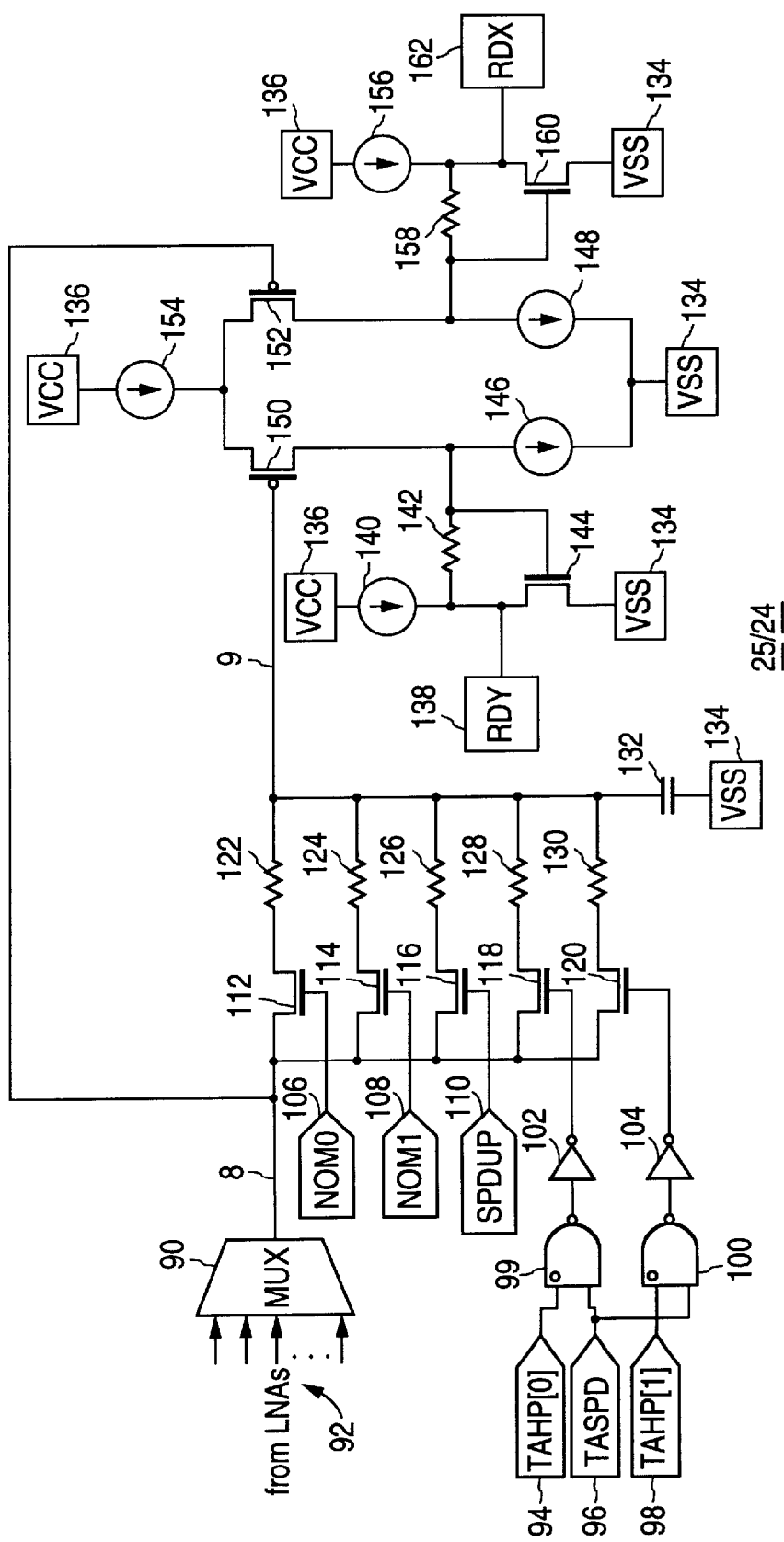
FIG. 3 illustrates programmable high-pass filter (HPF) which also functions as a single-ended input to differential output converter.

FIG. 3 shows transistor circuit and logic schematic for differential output buffer 25 and programmable HPF 24, which also functions as single-ended input to differential output converter. Input multiplexer MUX 90 selects one signal 8 of amplified signals 92 from multiple head LNAs (not shown). Advantage of multiplexing amplified signals instead of small input signal is that noise contribution from resistance of multiplexing transistors and associated wires is minimized due to higher signal-to-noise ratio.

Selected signal 8 is branched, wherein one connection goes directly to differential input transistor (P-channel) 152, and other connection goes through resistor-capacitor (RC) network, including resistor 122, capacitor 132 (i.e., when transistor 112 is turned on) to other side of differential input transistor (P-channel) 150. Low-frequency input signal is substantially unaffected by RC network, thereby appearing on both sides of such differential amplifier. Low-frequency input signal is regarded as common-mode signal and thus rejected. High-frequency signal couples to gate of transistor 152 and is amplified. Transistors 150, 152 couple to current source 154, which couples to Vcc 136, and respectively to current sources 146, 148, which couple to Vss 134.

Although preferred configuration is effectively pseudo differential output buffer circuit 25, it is observed from actual measurements that amplitude difference between RDX 162 and RDY 138 is usually less than +/-5%. This difference is due to differential MOS transistors 150, 152 have good common-mode reject ratio. Hence, such single-ended to differential signal converter is simpler in design, as well as quicker to settle when thermal asperity event occurs, in comparison to conventional implementations.

As shown, RDY 138 couples to such differential circuit through resistor 142 and transistor 144, which couples to Vss 134. RDY 138 also couples to current source 140, which couples to Vcc 136. Additionally, RDX 162 couples to such differential circuit through resistor 158 and transistor 160, which couples to Vss 134. RDX 162 also couples to current source 156, which couples to Vcc 136.

Transistor 144 together with feedback resistor 142 are arranged in "shunt—shunt" feedback configuration, as described herein. Main purpose of such voltage feedback circuit is to reduce output impedance and increase bandwidth of output circuit. Resistors 142, 158 serve as DC bias elements for output transistors 144, 160, respectively. Common-mode feedback circuit associated with differential amplifier is not required in present implementation, thereby providing relatively simple circuit.

When HPF 24 operates, various transistors 112, 114, 116, 118, 120 may, using digital MOS logic depending on disk drive operating requirements, for example, programmably switch multiplexed signal at node 8 to couple respectively through resistors 122, 124, 126, 128, 130 to node 9 to differential output buffer 25, as coupled through capacitor 132 to Vss 134.

Cut-off frequency of HPF 24 during normal read mode may be changed by turning on transistor 114 using NOM1 signal 108, instead of transistor 112 using NOM0 signal 106. During MR head switching, speed-up signal (SPDUP) 110 may be turned-on temporarily to switch transistor 116 to charge capacitor 132 relatively quickly to input common-mode level. Therefore, value of resistor 126 may be significantly smaller than that of resistor 122 or 124. However, SPDUP 110 may be turned-off during normal read periods. Otherwise, cut-off frequency of such HPF could be so high, so as to cause distortion of incoming signal group delay.

Moreover, speed-up circuit for thermal asperity correction is provided. During thermal asperity event, DC base line of input signal increases rapidly followed by slow exponential decay. In order to remove low-frequency thermal asperity signal, thermal asperity speedup signal (TASPD) 96 is turned-on momentarily, as applied to NAND gates 99, 100 and INV gates 102, 104 coupled respectively to transistors 118, 120, therefore, to charge capacitor 132 quickly. Hence, speed-up extent is programmable by selecting thermal asperity high pass filter settings TAHP[0] 94 and TAHP[1] 98, as shown.

Optionally, any or all resistors 122, 114, 126, 128, 130 of RC network shown may be omitted or provided with substantially reduced resistance value to achieve improved RC switching performance. For example, such resistor value(s) may be selectably adjusted to achieve amplifier implementation having certain more or less dominant 3 db cut-off frequency.

We claim:

1. A signal processor for processing a single ended input signal from a magneto-resistive head comprising:
   a plurality of selectable filters having an input in communication with the input signal, each of said plurality of selectable filters being selectable in response to a control signal; and
   a differential amplifier having a first input in communication with the input signal and a second input in communication with an output of said plurality of selectable filters.

2. A signal processor according to claim 1, wherein the control signal is selected from a group consisting of a head switching signal, a speedup signal, a thermal asperity speed up signal and a thermal asperity high pass filter signal.

3. A signal processor for processing an input signal from a magneto-resistive head comprising:
   a plurality of selectable filters having an input in communication with the input signal, each of said plurality of selectable filters being selectable in response to a control signal;
   a differential amplifier having a first input in communication with the input signal and a second input in communication with an output of said plurality of selectable filters; and
   a selector to select one of a plurality of input signals, wherein the input of said plurality of selectable filters is in communication with an output of said selector and wherein the first input of said differential amplifier is in communication with the output of said selector.

4. A signal processor for processing a single ended input signal from a magneto-resistive head comprising:
   a plurality of selectable filter means for filtering the input signal, each of said plurality of selectable filter means being selectable in response to a control signal; and
   differential amplifier means for amplifying the input signal at a first input thereof and an output of said plurality of selectable filter means at a second input thereof.

5. A circuit for amplifying a signal from a MR head, the circuit comprising:
   an input node for coupling to a first end of a MR head, wherein a second end of the head is coupled to a ground node;
   an amplifier circuit for receiving a biased signal from the head through the input node, the amplifier circuit comprising at least one transistor for generating from the received signal an amplified signal, and a blocking capacitor for decoupling the input node from the transistor;
   wherein the amplifier circuit is implemented in an integrated MOS circuit;
   wherein the amplifier circuit comprises a first MOS transistor having a gate, a source, and a drain, the gate being coupled to a first node of the blocking capacitor, wherein a second node of such capacitor is coupled to the input node;
   wherein the amplifier circuit further comprises a first resistor having a first and second nodes, the first node of the first resistor being coupled to the first node of the blocking capacitor and the gate of the first MOS transistor, the second node of the first resistor being coupled to the drain of the first MOS transistor; and
   wherein the amplifier circuit further comprises a second MOS transistor having a gate, source and a drain, the source of the second MOS transistor being coupled to the first node of the blocking capacitor, the drain of the second MOS transistor being coupled to the drain of the first transistor.

6. The circuit of claim 5 wherein:
   the amplifier circuit further comprises a feedback circuit coupled to the gate of the second MOS transistor, the feedback circuit comprising an operational amplifier for generating a control voltage.

7. The circuit of claim 6 wherein:
   the amplifier circuit further comprises a capacitor coupled to the operational amplifier for stabilizing the feedback circuit.

8. A circuit for amplifying a signal from a MR head, the circuit comprising:
   an input node for coupling to a first end of a MR head, wherein a second end of the head is coupled to a ground node;
   an amplifier circuit for receiving a biased signal from the head through the input node, the amplifier circuit comprising at least one transistor for generating from the received signal an amplified signal, and a blocking capacitor for decoupling the input node from the transistor;
   wherein the amplifier circuit is implemented in an integrated MOS circuit;

wherein the amplifier circuit comprises a first MOS transistor having a gate, a source, and a drain, the gate being coupled to a first node of the blocking capacitor, wherein a second node of such capacitor is coupled to the input node;

wherein the amplifier circuit further comprises a first resistor having a first and second nodes, the first node of the first resistor being coupled to the first node of the blocking capacitor and the gate of the first MOS transistor, the second node of the first resistor being coupled to the drain of the first MOS transistor; and wherein the amplifier circuit further comprises a second MOS transistor having a gate, a source, and a drain, the gate of the second MOS transistor being coupled to the drain of the first transistor.

9. The circuit of claim 8 wherein:

the amplifier circuit further comprises a second resistor having a first and second nodes, the first node of the second resistor being coupled to the gate of the second MOS transistor, the second node of the second resistor being coupled to the drain of the second MOS transistor.

10. The circuit of claim 9 wherein:

the amplifier circuit further comprises a first and second current source, the first current source coupled to the drain of the first transistor, the second current source coupled to the drain of the second transistor, the sources of the first and second transistors coupled to the ground node.

11. A signal processor for processing an input signal from a magneto-resistive head comprising:

a plurality of selectable filter means for filtering the input signal, each of said plurality of selectable filter means being selectable in response to a control signal;

differential amplifier means for amplifying the input signal at a first input thereof and an output of said plurality of selectable filter means at a second input thereof; and selecting means for selecting one of a plurality of input signals, wherein the input of said plurality of selectable filter means is in communication with an output of said selector means, and wherein the first input of said differential amplifier means is in communication with the output of said selector means.

12. A signal processor according to claim 11, wherein the control signal is selected from a group consisting of a head switching signal, a speedup signal, a thermal asperity speed up signal and a thermal asperity high pass filter signal.

13. A method of processing a single ended input signal from a magneto-resistive head comprising the steps of:

selecting at least one of a plurality of filters in response to a control signal;

filtering the input signal with the selected ones of the plurality of selectable filters; and differentially amplifying the input signal and an output of the plurality of selectable filters.

14. A method of processing an input signal from a magneto-resistive head comprising the steps of:

selecting at least one of a plurality of filters in response to a control signal;

filtering the input signal with the selected ones of the plurality of selectable filters;

differentially amplifying the input signal and an output of the plurality of selectable filters; and, selecting one of a plurality of input signals, wherein said filtering step filters the select one of the plurality of input signals.

15. A circuit for amplifying a signal from a magneto-resistive head, comprising:

a blocking capacitor having a first terminal in communication with one terminal of the magneto-resistive head;

a first MOS transistor have a gate in communication with a second terminal of said blocking capacitor; and a feedback tracking loop circuit comprising a second MOS transistor having a drain in communication with a drain of said first MOS transistor and a source in communication with a gate of said first MOS transistor and the second terminal of said blocking capacitor, wherein a resistance of said second MOS transistor is controlled by said feedback tracking loop circuit.

16. A signal processing circuit for processing a signal from a magneto-resistive head, comprising:

a low noise amplifier in communication with the magneto-resistive head having a single ended ouput; and a plurality of selectable filters having an input in communication with the single ended output of said low noise amplifier, each of said plurality of selectable filters being selectable in response to a control signal; and a differential amplifier having a first input in communication with the single ended output of said low noise amplifier and a second input in communication with an output of said plurality of selectable filters.

17. A signal processing circuit for processing a signal from a magneto-resistive head, comprising:

a low noise amplifier in communication with the magneto-resistive head; and a plurality of selectable filters having an input in communication with said low noise amplifier, each of said plurality of selectable filters being selectable in response to a control signal; and a differential amplifier having a first input connected to said low noise amplifier and a second input in communication with an output of said plurality of selectable filters, wherein said low noise amplifier comprises:

a blocking capacitor having a first terminal in communication with one terminal of the magneto-resistive head;

a first MOS transistor have a gate in communication with a second terminal of said blocking capacitor; and a feedback tracking loop circuit comprising a second MOS transistor having a drain in communication with a drain of said first MOS transistor and a source in communication with a gate of said first MOS transistor and the second terminal of said blocking capacitor.

18. A signal processor according to claim 17, further comprising a selector to select one of a plurality of input signals, wherein the input of said plurality of selectable filters is in communication with an output of said selector and wherein the first input of said differential amplifier is in communication with the output of said selector.

19. A signal processor according to claim 17, wherein the control signal is selected from a group consisting of head switching, speedup signal, thermal asperity speed up signals and thermal asperity high pass filter signal.

20. A signal processor for processing an input signal from a magneto-resistive head comprising:

a plurality of selectable filters having an input in communication with the input signal, each of said plurality of selectable filters being selectable in response to a control signal; and a differential amplifier having a first input connected to the input signal and a second input in communication with an output of said plurality of selectable filters.

21. A signal processor according to claim 20, wherein the control signal is selected from a group consisting of a head switching signal, a speedup signal, a thermal asperity speed up signal and a thermal asperity high pass filter signal.

22. A signal processor for processing an input signal from a magneto-resistive head comprising:

a plurality of selectable filter means for filtering the input signal, each of said plurality of selectable filter means being selectable in response to a control signal; and differential amplifier means for amplifying the input signal connected at a first input thereof and an output of said plurality of selectable filter means connected at a second input thereof.

23. A method of processing an input signal from a magneto-resistive head comprising the steps of:

selecting at least one of a plurality of filters in response to a control signal;

filtering the input signal with the selected ones of the plurality of selectable filters;

differentially amplifying the input signal and an output of the plurality of selectable filters.

24. A signal processing circuit for processing a signal from a magneto-resistive head, comprising:

a low noise amplifier in communication with the magneto-resistive head; and a plurality of selectable filters having an input in communication with said low noise amplifier, each of said plurality of selectable filters being selectable in response to a control signal; and a differential amplifier having a first input connected to said low noise amplifier and a second input in communication with an output of said plurality of selectable filters.

* * * * *